United States Patent
Terbrueggen et al.

(10) Patent No.: US 6,277,916 B1
(45) Date of Patent: Aug. 21, 2001

(54) PROCESS FOR PREPARING THERMOPLASTIC VULCANIZATES

(75) Inventors: Robert H. Terbrueggen, Pasadena, CA (US); Ray E. Drumright, Midland, MI (US); Thoi H. Ho, Lake Jackson, TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/257,771

(22) Filed: Feb. 25, 1999

(51) Int. Cl.$^7$ .................................................... C08L 53/00
(52) U.S. Cl. ................................ 525/95; 525/98; 525/194; 525/240
(58) Field of Search ............................. 525/194, 95, 98, 525/240

(56) References Cited

U.S. PATENT DOCUMENTS

| | | |
|---|---|---|
| 3,058,944 | 10/1962 | Breslow et al. . |
| 3,203,936 | 8/1965 | Breslow et al. . |
| 3,203,937 | 8/1965 | Breslow et al. . |
| 3,282,864 | 11/1966 | Best et al. . |
| 3,298,975 | 1/1967 | Feild et al. . |
| 3,336,268 | 8/1967 | Cox . |
| 3,341,480 | 9/1967 | Feild et al. . |
| 3,341,481 | 9/1967 | Palmer ................................ 260/2.5 |
| 3,377,415 | 4/1968 | Oppenlander . |
| 3,389,198 | 6/1968 | Taber . |
| 3,507,829 | 4/1970 | Bostick et al. . |
| 3,530,108 | 9/1970 | Oppenlander et al. . |
| 3,583,939 | 6/1971 | Bostick et al. . |
| 3,758,643 | 9/1973 | Fischer . |
| 3,770,696 | 11/1973 | Bostick et al. . |
| 3,855,184 | 12/1974 | Bostick et al. . |
| 4,130,535 | 12/1978 | Coran et al. . |
| 4,311,628 | 1/1982 | Abdou-Sabet et al. . |
| 4,352,892 | 10/1982 | Lohmar . |
| 4,477,631 | 10/1984 | Danesi et al. . |
| 4,579,905 | 4/1986 | Krabbenhoft . |
| 4,694,025 | 9/1987 | Park . |
| 4,714,716 | 12/1987 | Park . |
| 4,835,204 | 5/1989 | Carfagnini . |
| 5,037,895 | 8/1991 | Marker et al. . |
| 5,118,531 | 6/1992 | Peterson et al. . |
| 5,288,762 | 2/1994 | Park et al. . |
| 5,288,791 | 2/1994 | Collier, IV et al. . |
| 5,414,040 | 5/1995 | McKay et al. . |

FOREIGN PATENT DOCUMENTS

| | | |
|---|---|---|
| 797917 | 10/1968 | (CA) . |
| 1024296 | 1/1978 | (CA) . |
| 1 219 389 | 9/1998 | (CA) . |
| 198 16 681 A1 | 10/1998 | (DE) . |
| 0 416 815 A2 | 3/1991 | (EP) . |
| 0 572 990 A2 | 12/1993 | (EP) . |
| 0 634 427 | 1/1995 | (EP) . |
| 0 702 032 A2 | 3/1996 | (EP) . |
| 1080619 | 8/1967 | (GB) . |
| 2 205 103 | 11/1988 | (GB) . |
| 46/31756 | 9/1971 | (JP) . |
| 94/00500 | 1/1994 | (WO) . |
| 94/06858 A1 | 3/1994 | (WO) . |
| 96/07681 | 3/1996 | (WO) . |
| 99/10415 | 3/1999 | (WO) . |
| 99/10425 | 4/1999 | (WO) . |
| 99/10426 | 4/1999 | (WO) . |

OTHER PUBLICATIONS

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).

R. A. Abramovitch, T. Chellathurai, W. D. Holcomb, I. T. McMaster and D. P. Vanderpool, "Intramolecular Insertion of Arylsulfonylnitrenes into Aliphatic Side Chains", *J. Org. Chem.*, vol. 42, No. 17, pp. 2920–2926, (1977).

(List continued on next page.)

*Primary Examiner*—Bernard Lipman

(57) ABSTRACT

This invention includes a process for forming a thermoplastic vulcanizate comprising: (a) admixing a C—H insertion curing agent with at least one elastomeric phase polymer to form a first admixture; (b) admixing at least one non-elastomeric polyolefin with the first admixture to form a second admixture; and (c) heating the second admixture to a temperature at least the decomposition temperature of the curing agent to crosslink the elastomeric phase while mixing the admixture to an extent sufficient to result in the formation of a thermoplastic material, hereinafter referred to as a thermoplastic vulcanizate, and optionally including an additional step (d) of shaping the resulting thermoplastic vulcanizate, especially by heating and foaming or molding the TPV. The C—H insertion curing agent is preferably selected from alkyl and aryl azides (R—$N_3$), acyl azides (R—C(O)$N_3$), azidoformates (R—O—C(O)—$N_3$), sulfonyl azides (R—$SO_2$—$N_3$), phosphoryl azides ((RO)$_2$—(PO)—$N_3$), phosphinic azides ($R_2$—P(O)—$N_3$) and silyl azides ($R_3$—Si—$N_3$), with poly(sulfonyl azide) most preferred. Additionally, the invention includes a thermoplastic vulcanizate comprising a blend of: (1) an elastomeric phase crosslinked using a C—H insertion curing agent dispersed in; (2) at least one non-elastomeric thermoplastic polyolefin. The invention also includes a foamable composition comprising (1) an elastomeric phase crosslinked using a C—H insertion curing agent dispersed in; (2) at least one non-elastomeric thermoplastic polyolefin; and (3) from about 0.1 to about 25 percent by weight based on the combined weight of components (1) and (2) of at least one foaming agent as well as a fabricated part, cable jacket, cable insulation, or foam comprising the thermoplastic vulcanizate or the invention or resulting from the process of the invention.

24 Claims, No Drawings

OTHER PUBLICATIONS

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl– and Carbonyl–nitrenes", *J. Chem. Soc., Chem. Communi.*, pp. 1087–1088, (1981).

R. A. Abramovitch, M. Ortiz, and S. P. McManus, "Reaction of Aromatic Sulfonyl Azides with Dienes" J. Org. Chem., vol. 46, pp. 330–335, (1981).

H. Radusch, J. Ding, and M. Schulz, "Chemical coupling of polystyrene and polybutadiene in melt mixtures by using an organic sulfonylazide", *Die Angewandte Makrommoleculare Chemie*, vol. 204, pp. 177–189, (1993).

N. Takashima, Y. Nakayama, "The Processings of Crosslinked Plastics", *Kogaku Kogyo* (*Chemical Industry*), pp. 34(378)–29(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).

Derwent Abstract No. 77–02552Y of JP 51134762A (no date provided).

J. L. de Benito Gonzalez, L. Ibarra Rueda, and L. Gonzalez Hernandez, "The Use of Benzene 1,3–Sulphonyl Azide as an Elastomer Crosslinking Agent", *Kautschuk+Gummi, Kunststoffe 43. Jahgang*, Nr. pp. 146–149, (1990).

M. Xanthos, "Interfacial Agents for Multiphase Polymer Systems: Recent Advances", *Polymer Engineering and Science*, Vol. 28, No. 21, pp. 1392–1400, (1988).

L. Gonzales Hernandez, J. L. Benito Gonzales, L. Ibarra Rueda, and A. Rodriguez Diaz, "Effect of Different Cross–Linking Systems on Properties of Highly Saturated Nitrile Rubber Compounds", *Journal Applied Polymer Science*, vol. 4, pp. 1073–1078 (1994).

Derwent Abstract 77–886914/50 (JP 50133248A) (no date provided).

Derwent Abstract 68–24417P/OO (DE 1569025) (no date provided).

Nachr. Chem. Tech. Lab. 41 (Dec. 1993) Nr. 12, "Neue Generationen von Polyolefinmaterialien".

PROCESS FOR PREPARING THERMOPLASTIC VULCANIZATES

STATEMENT REGARDING FEDERALLY SPONSORED RESEARCH OR DEVELOPMENT

"Not Applicable"

BACKGROUND OF THE INVENTION

The subject invention pertains to blends of polymers, to a process for preparation thereof, and to products fabricated from such blends.

Elastomers are defined as materials which experience large reversible deformations under relatively low stress. Elastomers are typically characterized as having structural irregularities, non-polar structures, or flexible units in the polymer chain. Some examples of commercially available elastomers include natural rubber, ethylene/propylene (EPM) copolymers, ethylene/propylene/diene (EPDM) copolymers, styrene/butadiene copolymers, chlorinated polyethylene, and silicone rubber. Preferably, an elastomeric polymer can be stretched to at least twice its relaxed length with stress and after release of the stress returns to approximately the original dimensions and shape. Preferably elastic recovery of an elastomer before crosslinking as measured by ASTM D-412 is at least about 40 percent, more preferably at least about 60 percent, most preferably at least about 80 percent.

Thermoplastic elastomers are elastomers having thermoplastic properties. That is, thermoplastic elastomers are optionally molded or otherwise shaped and reprocessed at temperatures above their melting or softening point. One example of thermoplastic elastomers is styrene-butadiene-styrene (SBS) block copolymer. SBS block copolymers exhibit a two phase morphology consisting of glassy polystyrene domains connected by rubbery butadiene segments. At temperatures between the glass transition temperatures of the butadiene midblock and the styrene endblocks, that is, at temperatures from $-90°$ C. to $116°$ C., the SBS copolymers act like a crosslinked elastomer.

In contrast, thermoset elastomers are elastomers having thermoset properties. That is, thermoset elastomers irreversibly solidify or "set" when heated, generally due to an irreversible crosslinking reaction. In the practice of the instant invention, a gel content of at least about 20 weight percent based on total elastomer as measured by xylene extraction is considered thermoset. Two examples of thermoset elastomers are crosslinked ethylene-propylene monomer rubber (EPM) and crosslinked ethylene-propylene-diene monomer rubber (EPDM). EPM materials are made by copolymerization of ethylene and propylene. EPM materials are typically cured with peroxides to give rise to crosslinking, and thereby induce thermoset properties. EPDM materials are linear interpolymers of ethylene, propylene, and a nonconjugated diene such as 1,4-hexadiene, dicyclopentadiene, or ethylidene norbornene. EPDM materials are typically vulcanized with sulfur to induce thermoset properties, although they alternatively are optionally cured with peroxides. While EPM and EPDM materials are advantageous in that they have applicability in higher temperature applications, EPM and EPDM elastomers suffer the disadvantages of low green strength (at lower ethylene contents), of a higher susceptibility of the cured elastomer to attack by oils than characteristic of styrene butadiene rubbers, and of resistance of the cured elastomer to surface modification.

Thermoplastic vulcanizates (TPV's) are polyolefinic matrices, preferably crystalline, through which thermoset elastomers are generally uniformly distributed. Examples of thermoplastic vulcanizates include EPM and EPDM thermoset materials distributed in a crystalline polypropylene matrix. One example of a commercial TPV is Satoprene™ thermoplastic rubber which is manufactured by Advanced Elastomer Systems and is a mixture of crosslinked EPDM particles in a crystalline polypropylene matrix. These materials have found utility in many applications which previously used vulcanized rubber, e.g. hose, gaskets, and the like TPV's are noted for their processability as thermoplastics while retaining the excellent tensile and compression set properties of vulcanized rubbers.

Commercial TPV's are typically based on vulcanized rubbers in which a phenolic resin or sulfur cure system is used to vulcanize, that is to crosslink, a diene (or more generally, a polyene) copolymer rubber by way of dynamic vulcanization, that is crosslinking while mixing (typically vigorously), in a thermoplastic matrix. Sulfur or a phenolic resin is preferred over peroxide free radical cure systems because peroxide degrades a polypropylene or and crosslinks a polyethylene as well as the rubber and this is in turn limits the extent of rubber crosslinking that can occur before the entire mixture degraded or crosslinked and is no longer thermoplastic.

In the art such as evidenced by PCT patent application WO96/07681 (McKay et al.) the preferred method of preparing a thermoplastic vulcanizate is to form an admixture of non-crosslinked elastomeric polymer and polyolefin resin and curing agent then masticate the admixture at a vulcanization temperature. Preferably the non-crosslinked polymer, polyolefin are intimately mixed before a curing agent is added.

C—H insertion reagents like poly(sulfonyl azide)s have been used to achieve coupling of certain elastomers and blends for instance as disclosed in copending U.S. applications: U.S. application Ser. No. 60/057,713, filed Aug. 27, 1997; U.S. application Ser. No. 09/140,900, filed Aug. 26, 1998 and U.S. application Ser. No. 09/129,163 filed Aug. 5, 1998 to achieve coupling which involves no more than about 10 percent, preferably less than about 2 weight percent gel, depending on the polymer and purpose for which it is used. Using advantageously less than about 0.3 weight percent poly(sulfonyl azide) based on polymer results in retaining thermoplastic properties. In a blend, the coupling processes do not result in crosslinking an elastomeric phase. It would be desirable to have a process for making a thermoplastic vulcanizate using a C—H insertion curing agent that can be compression molded, advantageously having a compression set at $70°$ C. less than that of a coupled polymer as taught in the cited references, preferably less than 97 percent, more preferably less than about 90 percent, most preferably less than about 70 percent compression set.

SUMMARY OF INVENTION

It has been found that in contrast to the art preferred process, a process of forming a thermoplastic vulcanizate by admixing the elastomeric phase with the curing agent before adding the polyolefin has thermoplastic properties useful in melted shaping processes such as compression molding, injection molding, thermoforming, blow molding, and calendering.

The invention includes a process for forming a thermoplastic vulcanizate comprising:

(a) admixing a C—H insertion curing agent with at least one elastomeric phase polymer to form a first admixture;

(b) admixing at least one non-elastomeric polyolefin with the first admixture to form a second admixture; and (c) heating the second admixture to a temperature at least the decomposition temperature of the curing agent to crosslink the elastomeric phase while mixing the admixture to an extent sufficient to result in the formation of a thermoplastic material, hereinafter thermoplastic vulcanizate.

It is preferred that the non-elastomeric polyolefin be less reactive with the curing agent than is the elastomeric phase. It is also preferable that the step (b) admixing be sufficient to disperse the first admixture in the non-elastomeric phase but not sufficient to result in a crosslinking amount of curing agent being admixed into the non-elastomer phase. Advantageously, there is sufficient curing agent at the interface between elastomers and non-elastomeric phase to improve compatibility between the phases.

The invention further provides a thermoplastic vulcanizate comprising a blend of:

(1) an elastomeric phase crosslinked using a C—H insertion curing agent, said phase dispersed in;

(2) at least one non-elastomeric thermoplastic polyolefin.

The polyolefin contains insufficient curing agent to become crosslinked.

Further, the invention includes a foamable composition comprising (1) an elastomeric phase crosslinked using a C—H insertion curing agent, said phase dispersed in;

(2) at least one non-elastomeric thermoplastic polyolefin; and (3) from about 0.1 to about 25 percent by weight based on the combined weight of components (1) and (2) of at least one foaming agent.

The invention further comprises fabricated parts, cable jackets, cable insulation, and foams comprising the thermoplastic vulcanizates having partially or totally crosslinked elastomeric phases of the invention.

DETAILED DESCRIPTION OF THE INVENTION

The term "polymer" as used herein refers to a polymeric compound prepared by polymerizing monomers whether of the same or a different type. The generic term is polymer thus embraces the term homopolymer, usually employed to refer to polymers prepared from only one type of monomer, and the term interpolymer as defined hereinafter.

As used herein, the terms "crosslinked polymers" and "thermoset polymers" are used interchangeably, and mean homopolymers or interpolymers which have greater than 20 percent gel as determined by xylene extraction. In the case of thermoplastic vulcanizates, the percentage of gel is based on the total weight of the elastomeric phase.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 and the like are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "interpolymer" as used herein refers to polymers prepared by the polymerization of at least two different types of monomers. The generic term interpolymer thus includes copolymers, usually employed to refer to polymers prepared from two different monomers, and polymers prepared from more than two different types of monomers.

Statements herein that a polymer or interpolymer comprises or contains certain monomers, mean that such polymer or interpolymer comprises or contains polymerized therein units derived from such a monomer. For example, if a polymer is said to contain ethylene monomer, the polymer will have incorporated in it an ethylene derivative, that is, —CH$_2$—CH$_2$—. Such a polymer is also referred to as having ethylene repeating units.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "monomer residue" or "polymer units derived from such monomer" means that portion of the polymerizable monomer molecule which resides in the polymer chain as a result of being polymerized with another polymerizable molecule to make the polymer chain.

Compositions of the invention comprise at least one elastomeric phase and at least one non-elastomeric polymer.

The elastomeric phase is any polymer which, after reaction with the C—H insertion curing agent used in the practice of the invention, is an elastomer as described previously. The terms "elastomeric phase" and "elastomeric polymer" are used to designate this polymer in the description of the invention although the polymer optionally is not strictly elastomeric before reaction with the C—H insertion agent, to distinguish it from the other (non-elastomeric) polymer (also referred to as non-elastomeric phase or non-elastomeric polymer) with which it is admixed. Advantageously the elastomeric polymer reacts with the C—H insertion agent, preferably a poly(sulfonyl azide), faster than the corresponding non-elastomeric polymer with which it is used. In general, polymers formed at least partially from aromatic monomers, advantageously vinylidene monomers, are expected to react faster than polymers formed entirely from aliphatic monomers. Such aromatic elastomeric phase polymers are, therefore, preferred although other elastomeric polymers within the skill in the art are suitable for use in the practice of the invention. Similarly, aliphatic non-elastomer phase polymers are preferred. For instance, in a preferred embodiment when the non-elastomeric phase is an aliphatic polymer comprising at least about 50 weight percent, preferably 80 weight percent and more preferably 100 weight percent propylene repeating units, optionally copolymerized with ethylene or other aliphatic alpha olefins, the elastomeric phase preferably includes such polymers as substantially random interpolymers comprising an olefin and a vinylidene aromatic monomer, or other elastomeric polymers formed from vinylidene aromatic monomers such as styrene block polymers including styrene-isoprene-styrene (SIS), styrene-ethylene-butene-styrene (SEBS) and styrene-butadiene-styrene (SBS) polymers are preferred for the elastomeric phase.

The elastomeric phase is preferably an amorphous polyolefin of significantly high molecular weight so that minimal amounts of crosslinking agent are sufficient to induce a high degree of crosslinking. The amount of crosslinking agent is dependent on molecular weight of the polymer with which it reacts. The molecular weight of the elastomeric phase is preferably at least 10,000, more preferably 30,000 and most preferably at least 50,000. There is no upper limit to the molecular weight of the elastomeric phase, however it is often preferable that the elastomeric phase be of sufficiently low molecular weight that thermoplastic properties are evident prior to crosslinking allowing the elastomer to be melt processed and easily mixed with components.

The elastomeric phase compositions used in the practice of the invention are preferably substantially random interpolymers comprising an olefin and a vinylidene aromatic monomer.

A substantially random interpolymer comprising in polymerized form i) one or more a-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s).

The term "interpolymer" is used herein to indicate a polymer wherein at least two different monomers are polymerized to make the interpolymer.

The term "substantially random" in the substantially random interpolymer resulting from polymerizing i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s) as used herein generally means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random interpolymer resulting from polymerizing one or more α-olefin monomers and one or more vinyl or vinylidene aromatic monomers, and optionally other polymerizable ethylenically unsaturated monomer(s), does not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon$^{-13}$ NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" is meant a substantially random interpolymer produced from the above-mentioned monomers.

Suitable α-olefin monomers which are useful for preparing the substantially random interpolymer include, for example, α-olefin monomers containing from 2 to 20, preferably from 2 to 12, more preferably from 2 to 8 carbon atoms. Preferred such monomers include ethylene, propylene, butene-1, 4-methyl-1-pentene, hexene-1 and octene-1. Most preferred are ethylene or a combination of ethylene with $C_{3-8}$-α-olefins. These α-olefins do not contain an aromatic moiety.

Suitable vinyl or vinylidene aromatic monomers which can be employed to prepare the substantially random interpolymer include, for example, those represented by the following formula I

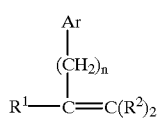

(formula I)

wherein $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Particularly suitable such monomers include styrene and lower alkyl- or halogen-substituted derivatives thereof. Exemplary monovinyl or monovinylidene aromatic monomers include styrene, vinyl toluene, α-methylstyrene, t-butyl styrene or chlorostyrene, including all isomers of these compounds. Preferred monomers include styrene, α-methyl styrene, the lower alkyl- ($C_1$–$C_4$) or phenyl-ring substituted derivatives of styrene, such as for example, ortho-, meta-, and para-methylstyrene, the ring halogenated styrenes, para-vinyl toluene or mixtures thereof. A more preferred aromatic monovinyl monomer is styrene.

By the term "sterically hindered aliphatic or cycloaliphatic vinyl or vinylidene monomers", it is meant addition polymerizable vinyl or vinylidene monomers corresponding to the formula:

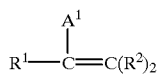

wherein $A^1$ is a sterically bulky, aliphatic or cycloaliphatic substituent of up to 20 carbons, $R^1$ is selected from the group of radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; or alternatively $R^1$ and $A^1$ together form a ring system. By the term "sterically bulky" is meant that the monomer bearing this substituent is normally incapable of addition is polymerization by standard Ziegler-Natta polymerization catalysts at a rate comparable with ethylene polymerizations. α-Olefin monomers containing from 2 to about 20 carbon atoms and having a linear aliphatic structure such as propylene, butene-1, hexene-1 and octene-1 are not considered as sterically hindered aliphatic monomers. Preferred sterically hindered aliphatic or cycloaliphatic vinyl or vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl or norbornyl. Most preferred sterically hindered aliphatic or cycloaliphatic vinyl or vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The substantially random interpolymers usually contain from about 0.5 to about 65, preferably from about 1 to about 55, more preferably from about 2 to about 50 mole percent of at least one vinyl or vinylidene aromatic monomer and/or sterically hindered aliphatic or cycloaliphatic vinyl or vinylidene monomer and from about 35 to about 99.5, preferably from about 45 to about 99, more preferably from about 50 to about 98 mole percent of at least one aliphatic α-olefin having from 2 to about 20 carbon atoms.

Other optional polymerizable ethylenically unsaturated monomer(s) include strained ring olefins such as norbornene and $C_{1-10}$-alkyl or $C_{6-10}$-aryl substituted norbornenes, with an exemplary substantially random interpolymer being ethylene/styrene/norbornene.

The most preferred substantially random interpolymers are interpolymers of ethylene and styrene and interpolymers of ethylene, styrene and at least one α-olefin containing from 3 to 8 carbon atoms.

The number average molecular weight (Mn) of the substantially random interpolymers is usually greater than about 5,000, preferably from about 20,000 to about 1,000,000, more preferably from about 50,000 to about 500,000. The melt index $I_2$ according to ASTM D 1238 Procedure A, condition E, generally is from about 0.01 to about 50 g/10 min., preferably from about 0.01 to about 20 g/10 min., more preferably from about 0.1 to about 10 g/10 min., and most preferably from about 0.5 to about 5 g/10 min. The glass transition temperature (Tg) of the substantially random interpolymers is preferably from about −40° C. to about +35° C., preferably from about 0° C. to about +30° C., most preferably from about +10° C. to about +25° C., measured according to differential mechanical scanning (DMS).

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinyl or vinylidene aromatic homopolymer may be formed due to homopolymerization of the vinyl or vinylidene aromatic monomer at elevated temperatures. The presence of vinyl or vinylidene aromatic homopolymer is in general not detrimental for the purposes of the present invention and can be tolerated. The vinyl or vinylidene aromatic homopolymer may be separated from the substantially random interpolymer, if desired, by extraction techniques such as selective precipitation from solution with a non solvent for either the substantially random interpolymer or the vinyl or vinylidene aromatic homopolymer. For the purpose of the present invention it is preferred that no more than 20 weight percent, preferably less than 15 weight percent, based on the total weight of the interpolymers of vinyl or vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 (corresponding to EP-A-0,416,815) by James C. Stevens et al. and in U.S. Pat. No. 5,703,187. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/545,403, filed Jul. 3, 1990 (corresponding to EP-A-416,815); U.S. application Ser. No. 547,718, filed Jul. 3, 1990 abandon (corresponding to EP-A-468,651); U.S. application Ser. No. 07/702,475, filed May 20, 1991 abandon (corresponding to EP-A-514,828); U.S. application Ser. No. 07/876,268, filed May 1, 1992 U.S. Pat. No. 5,721,185 (corresponding to EP-A-520,732); U.S. application Ser. No. 884,966, filed May 15, 1992 U.S. Pat. No. 5,350,723 (corresponding to WO 93/23412); U.S. Pat. No. 5,374,696, filed Jan. 21, 1993; U.S. application Ser. No. 34,434, filed Mar. 19, 1993 U.S. Pat. No. 5,347,024 (corresponding to WO 94/01647); U.S. application Ser. No. 08/241,523, filed May 12, 1994, U.S. Pat. No. 5,470,993 (corresponding to WO 94/06834 and EP 0,705,269); as well as U.S. Pat. Nos. 5,055,438; 5,057,475; 5,096,867; 5,064,802; 5,132,380; and 5,189,192; 5,321,106; 5,347,024; 5,350,723; 5,374,696; 5,399,635; 5,460,993 and 5,556,928.

The substantially random α-olefin/vinyl(idene) aromatic interpolymers can also be prepared by the methods described by John G. Bradfute et al. (W.R. Grace & Co.) in WO 95/32095; by R. B. Pannell (Exxon Chemical Patents, Inc.) in WO 94/00500; and in Plastics Technology, page 25 (September 1992.

Also suitable are the substantially random interpolymers which comprise at least one α-olefin/vinyl aromatic/vinyl aromatic/α-olefin tetrad. These interpolymers contain additional signals with intensities greater than three times the peak to peak noise. These signals appear in the chemical shift range 43.75 to 44.25 ppm and 38.0 to 38.5 ppm. Specifically, major peaks are observed at 44.1, 43.9 and 38.2 ppm. A proton test NMR experiment indicates that the signals in the chemical shift region 43.75 to 44.25 ppm are methine carbons and the signals in the region 38.0 to 38.5 ppm are methylene carbons.

In order to determine the carbon-$^{13}$ NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-$^{13}$ NMR peaks but with slightly different chemical shifts.

These interpolymers are prepared by conducting the polymerization at temperatures of from about −30° C. to 250° C. in the presence of such catalysts as those represented by the formula

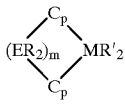

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to 30, preferably from 1 to 20, more preferably from 1 to 10 carbon or silicon atoms; each R' is independently, each occurrence, H, halo, hydrocarbyl, hyrocarbyloxy, silahydrocarbyl, hydrocarbylsilyl containing up to 30, preferably from 1 to 20, more preferably from 1 to 10, carbon or silicon atoms or two R' groups together can be a $C_{1-10}$ hydrocarbyl substituted 1,3-butadiene; m is 1 or 2; and optionally, but preferably in the presence of an activating cocatalyst, such as tris(pentafluorophenyl) borane or methylalumoxane (MAO). Particularly suitable substituted cyclopentadienyl groups include those illustrated by the formula:

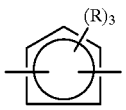

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl)) zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-C1-4 alkyl, racemic-(dimethylsilanediyl(2-methyl-4-phenylindenyl))zirconium di-C1-4 alkoxide, or any combination thereof.

Further preparative methods for the substantially random interpolymer have been described in the literature. Longo and Grassi (Makromol. Chem., Volume 191, pages 2387 to 2396 [1990]) and D'Anniello et al. (Journal of Applied Polymer Science, Volume 58, pages 1701 to 1706 [1995]) reported the use of a catalytic system based on methylalumoxane (MAO) and cyclopentadienyltitanium trichloride (CpTiCl$_3$) to prepare an ethylene-styrene copolymer. Xu and Lin (Polymer Preprints, Am.Chem.Soc.,Div.Polym.Chem., volume 35, pages 686, 687 [1994]) have reported copolymerization using a MgCl$_2$/TiCl$_4$/NdCl$_3$/Al(iBu)$_3$ catalyst to give random copolymers of styrene and propylene. Lu et al. (Journal of Applied Polymer Science, volume 53, pages 1453 to 1460 [1994]) have described the copolymerization of ethylene and styrene using a TiCl$_4$/NdCl$_3$/MgCl$_2$/Al(Et)$_3$ catalyst. Sernetz and Mulhaupt, (Macromol. Chem. Phys., volume 197, pages 1071 to 1083 [1997]) have described the influence of polymerization conditions on the copolymerization of styrene with ethylene using Me$_2$Si(Me$_4$Cp)(N-tert-butyl)TiCl$_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd.

The level of vinylidene aromatic monomer incorporated in the thermoset elastomers is at least 30, preferably at least 35 weight percent based on the weight of the interpolymer. The vinylidene aromatic monomer is advantageously incorporated in the elastomeric phase in an amount less than 70, more advantageously less than 60 weight percent based on the weight of the other polymer(s) in the elastomeric phase.

The substantially random interpolymers advantageously contain from about 0.5 to about 65, preferably from about 1 to about 55, more preferably from about 2 to about 50 mole percent of at least one vinylidene aromatic monomer and/or hindered aliphatic or cycloaliphatic vinylidene monomer and from about 35 to about 99.5, preferably from about 45 to about 99, more preferably from about 50 to about 98 mole percent of at least one aliphatic α-olefin having from 2 to about 20 carbon atoms.

One or more dienes can optionally be incorporated into the interpolymer to provide functional sites of unsaturation on the interpolymer useful, for example, to participate in crosslinking reactions. While conjugated dienes such as butadiene, 1,3-pentadiene (that is, piperylene), or isoprene is optionally used for this purpose, nonconjugated dienes are preferred. Typical nonconjugated dienes include, for example the open-chain nonconjugated diolefins such as 1,4-hexadiene (see U.S. Pat. No. 2,933,480) and 7-methyl-1,6-octadiene (also known as MOCD); cyclic dienes; bridged ring cyclic dienes, such as dicyclopentadiene (see U.S. Pat. No. 3,211,709); or alkylidenenorbomenes, such as methylenenorbomene or ethylidenenorbomene (see U.S. Pat. No. 3,151,173). The nonconjugated dienes are not limited to those having only two double bonds, but rather also include those having three or more double bonds.

The diene is incorporated in the elastomers in an amount of from 0 to 15 weight percent based on the total weight of the interpolymer. When a diene is employed, it will preferably be provided in an amount of at least 2 weight percent, more preferably at least 3 weight percent, and most preferably at least 5 weight percent, based on the total weight of the interpolymer. Likewise, when a diene is employed, it will be provided in an amount of no more than 15, preferably no more than 12 weight percent based on the total weight of the interpolymer.

The number average molecular weight (Mn) of the polymers and interpolymers is advantageously greater than about 5,000, preferably from about 10,000 to about 1,000,000, more preferably from about 50,000 to about 500,000.

The conditions for polymerizing the α-olefin, vinylidene aromatic, and optional diene are generally those useful in the solution polymerization process, although the application of the present invention is not limited thereto. High pressure, slurry and gas phase polymerization processes are also believed to be useful, provided the proper catalysts and polymerization conditions are employed.

In general, the polymerization is optionally accomplished at conditions well known in the prior art for Ziegler-Natta or Kaminsky-Sinn type polymerizations. In particular, the polymerization will advantageously involve pressures from atmospheric up to 1000 atmospheres (100 MPa) and temperatures from 0° C. to 250° C.

While polymerizing and isolating the substantially random interpolymer, a small amount of atactic vinylidene aromatic homopolymer is sometimes formed due to homopolymerization of the vinylidene aromatic monomer. In general, the higher the polymerization temperature is, the higher is the amount of homopolymer formed. The presence of vinylidene aromatic homopolymer is in general not detrimental for the purposes of the present invention and can be tolerated. For the purpose of the present invention it is preferred that no more than 20 weight percent, preferably less than 15 weight percent based on the total weight of the interpolymers of vinylidene aromatic homopolymer is present. If desired, the vinylidene aromatic homopolymer is optionally at least partially separated from the substantially random interpolymer, if desired, such as by extraction with a suitable extracting solvent.

The substantially random interpolymers are optionally modified by typical grafting, crosslinking, hydrogenation, flinctionalizing, or other reactions well known to those skilled in the art, provided that the elastomeric properties of the interpolymers are not substantially affected. The polymers are optionally readily sulfonated or chlorinated to provide functionalized derivatives according to established techniques.

Alternative preferred elastomeric phase polymers include elastomeric block copolymers. The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof. Preferably, the predominant structure is that of triblocks and more preferably that of linear triblocks.

The preparation of the block copolymers useful herein is not the subject of the present invention. Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result from sequential introduction of the desired rubber monomer into the reaction vessel when using such initiators as lithium-alkyls or dilithiostilbene, or from coupling a two segment block copolymer with a difunctional coupling agent. Structures which behave rheologically like branched structures, on the other hand, are optionally obtained by the use of suitable coupling agents having a functionality with respect to the block copolymers with unsaturated rubber monomer units of three or more. Coupling is optionally effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer are optionally ignored for an adequate description of the block copolymers forming a part of the composition of this invention.

Suitable block copolymers having unsaturated rubber monomer units include, but is not limited to, styrene-butadiene (SB), styrene-isoprene (SI), styrene-butadiene-styrene (SBS), styrene-isoprene-styrene (SIS), α-methylstyrene-butadiene-a-methylstyrene and α-methylstyrene-isoprene-α-methylstyrene.

The styrenic portion of the block copolymer is preferably a polymer or interpolymer of styrene and its analogs and homologs including α-methylstyrene and ring-substituted styrenes, particularly ring-methylated styrenes. The preferred styrenics are styrene and α-methylstyrene, and styrene is particularly preferred.

Block copolymers with unsaturated rubber monomer units optionally comprise homopolymers of butadiene or isoprene and copolymers of one or both of these two dienes with a minor amount of styrenic monomer. When the monomer employed is butadiene, it is preferred that between 35 and 55 mole percent of the condensed butadiene units in the butadiene polymer block have 1,2 configuration. Thus, when such a block is hydrogenated, the resulting product is, or resembles a regular copolymer block of ethylene and 1-butene (EB). If the conjugated diene employed is isoprene, the resulting hydrogenated product is or resembles a regular copolymer block of ethylene and propylene (EP). Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, and styrene/ethylene-propylene/styrene (SEPS) copolymers.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is advantageously between 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks advantageously vary within certain limits. In most instances, the styrenic block segments have number average molecular weights in the range of 5,000 to 125,000, preferably from 7,000 to 60,000 while the rubber monomer block segments have average molecular weights in the range of 10,000 to 300,000, preferably from 30,000 to 150,000. The total average molecular weight of the block copolymer is advantageously in the range of 25,000 to 250,000, preferably from 35,000 to 200,000. These molecular weights are as determined by tritium counting methods or osmotic pressure measurements.

Further, the various block copolymers suitable for use in the present invention are optionally modified by graft incorporation of minor amounts of functional groups, such as, for example, maleic anhydride by any of the methods well known in the art.

Block copolymers useful in the present invention are commercially available, such as, for example, supplied by Shell Chemical Company under the trade designation of KRATON and supplied by Dexco Polymers under the trade designation of VECTOR.

Other elastomeric polymers useful in the practice of the invention include elastomers within the skill in the art, particularly elastomers prepared from α-olefins and dienes (both previously discussed), particularly ethylene-propylene-diene monomer (EPDM) polymers. Such polymers are within the skill in the art, prepared for instances using Ziegler-Natta, metallocene or constrained geometry catalysts. Such polymers are also commercially available for instance from DuPont-Dow Elastomers under the trade designation NORDEL™ ethylene/propylene/diene polymers. In these polymers while any diene polymerizable with ethylene and propylene is suitable, the preferred dienes are 1–4 hexadiene or ethylenenorbornadiene, which are preferably present in an amount from about 0.5 to about 5 weight percent based on elastomeric phase polymer. The number average molecular weight (Mn) is preferably from about 10,000 to about 100,000. Preferably the polymers have a crystallinity less than about 20 weight percent.

Likewise, blends of the elastomeric phase polymer with polyvinylchloride (PVC) or ethylene vinyl alcohol (EVOH) is optionally suitably employed.

The elastomeric phase is admixed with at least one non-elastomeric polyolefin and optionally the admixture includes various additives, such as carbon black, silica, titanium dioxide, colored pigments, clay, zinc oxide, stearic acid, accelerators, curing agents, sulfur, stabilizers, antidegradants, processing aids, adhesives, tackifiers, plasticizers, wax, precrosslinking inhibitors, discontinuous fibers (such as wood cellulose fibers) and extender oils. Such additives are optionally provided either prior to, during, or subsequent to curing the elastomeric phase polymers. The elastomeric phase polymers are advantageously mixed with a filler, an oil, and a curing agent at an elevated temperature to compound them. The compounded material is the subsequently cured at a temperature which is advantageously greater than that employed during compounding.

Optionally and preferably, carbon black is added to the elastomeric phase polymer prior to curing. Carbon black is frequently added to improve the tensile strength or toughness of the compounded product, but can also be used as an extender or to mask the color of the compounded product. Carbon black will advantageously be provided in an amount from 0 to 80 weight percent, preferably from 0.5 to 50 weight percent, based on the total weight of the formulation. When the carbon black is employed to mask a color, it is advantageously employed in the range of 0.5 to 10 weight percent, based on the weight of the formulation. When the carbon black is employed to increase toughness and/or decrease the cost of the formulation, it is advantageously employed in amounts greater than 10 weight percent based on the weight of the formulation.

Moreover, preferably, one or more extender oils will be added to the elastomeric phase polymer prior to curing. Extender oils are advantageously added to improve processability and low temperature flexibility, as well as to decrease cost. Suitable extender oils are listed in Rubber World Blue Book 1975 Edition, Materials and Compounding Ingredients for Rubber, pages 145–190. Typical classes of extender oils include aromatic, naphthenic, and paraffinic extender oils. The extender oil(s) will advantageously be provided in an amount from 0 to 50 weight percent. When employed, the extender oil will advantageously be provided in an amount of at least 5 weight percent, more advantageously in an amount of from 15 to 25 weight percent, based on the total weight of the formulation.

The curing agent(s) are preferably provided in an amount of from about 0.5 to about 12 weight percent, based on the total weight of the formulation.

Suitable curing agents include compounds which react with the elastomeric phase by insertion into a C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron*, (1985), 41(8), pages 1509–1516, and nitrenes as generated from azides, as cited in Abramovitch, R. A., Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7), 883–9.

Compounds having at least two functional groups capable of C—H insertion under reaction conditions are referred to herein as curing agents or crosslinking agents.

Preferred polyfunctional compounds capable of insertions into C—H bonds include poly(sulfonyl azide)s. The poly (sulfonyl azide) is any compound having at least two sulfonyl azide groups (—$SO_2N_3$) reactive with the polyolefin. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting crosslinked polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonlazide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7- naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides ($R-N_3$), acyl azides ($R-C(O)N_3$), azidoformates ($R-O-C(O)-N_3$), sulfonyl azides ($R-SO_2-N_3$), phosphoryl azides ($(RO)_2-(PO)-N_3$), phosphinic azides ($R_2-P(O)-N_3$) and silyl azides ($R_3-Si-N_3$). Some of the crosslinking agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred crosslinking agents is conveniently possible because of the differences in the temperatures at which the different classes of crosslinking agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the crosslinking agent adequately dispersed and located substantially in the desired position in the final product. Such location and dispersion may be different from product to product depending on the desired properties of the final product.) Phosphoryl azides may be reacted at temperatures in excess of 180° C. up to about 300° C. while silyl azides react preferentially at temperatures of from about 250° C. to 400° C.

Those skilled in the art will be readily able to select amounts of curing agent, with the amount selected taking into account characteristics of the elastomeric phase polymer or blend comprising such elastomeric phase polymer, such as molecular weight, molecular weight distribution, comonomer content, the presence of crosslinking enhancing coagents, additives (such as oil) and the like. Those skilled in the art may use the following guidelines as a reference point in optimizing the amount of curing agent preferred for the particular blends in question.

To cure a polymer the curing agent is used in a curing amount, that is advantageously an amount effective to result in at least about 20 weight percent gel as measured by xylene extraction, preferably an amount effective to result in at least about 30 percent, more preferably at least about 70, most preferably about 90 percent gel based on weight of elastic phase polymer. While those skilled in the art will recognize that the amount of poly(sulfonyl azide) sufficient to crosslink and result at least about 20 weight percent gel will depend on molecular weight of the azide used and polymer type, molecular weight or melt flow index, and MWD. The amount is preferably at least about 0.2 phr (parts per hundred by weight of elastomeric polymer), more preferably at least about 1 phr, most preferably at least about 2 phr poly (sulfonyl azide) based on total weight of elastomeric phase polymer when the poly(sulfonyl azide) has a molecular weight of from about 200 to about 2000.

Advantageously, the amount of curing agent employed will not exceed that which is required to effect a desired level of crosslinking. For most polymers, that amount is advantageously less than about 10 phr, preferably less than about 5 phr, more preferably less than about 4 phr.

To achieve curing, the poly(sulfonyl azide) (as representative of C—H insertion agents in this description) is heated in the presence of the polymer to at least the decomposition temperature of the sulfonyl azide. By decomposition temperature of the poly(sulfonyl azide) it is meant that temperature at which the azide converts to the sulfonyl nitrene, eliminating nitrogen and heat in the process, as determined by differential scanning calorimetry (DSC). The poly (sulfonyl azide) begins to react at a kinetically significant rate (convenient for use in the practice of the invention) at temperatures of about 130° C. and is almost completely reacted at about 160° C. in a DSC (scanning at 10° C./min). ARC (scanning at 2° C./hr) shows onset of decomposition is about 100° C. Extent of reaction is a function of time and temperature. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the curing agent with the polymer(s) without undesirable thermal degradation of the polymer matrix. Preferred reaction times in terms of the half life of the crosslinking agent, that is the time required for about half of the agent to be reacted at a preselected temperature, which half life is determinable by DSC is about 5 half lives of the crosslinking agent. In the case of a bis(sulfonyl azide), for instance, the reaction time is preferably at least about 4 minutes at 200° C. When a larger mass of polymer or thick article is produced, longer time periods are often required for adequate heat to penetrate the polymer; such times are conveniently around 20 minutes.

Preferred azide functional curing agent include especially azidoformates, such as tetramethylenebis(azidoformate) (see, also, U.S. Pat. No. 3,284,421, Breslow, Nov. 8, 1966); aromatic polyazides, such as 4,4'-diphenylmethane diazide (see, also, U.S. Pat. No. 3,297,674, Breslow et al., Jan. 10, 1967); and sulfonazides, such as p,p'-oxybis(benzene sulfonyl azide).

In certain embodiments of the claimed invention, dual cure systems, which use a combination of heat, moisture cure, and radiation steps, are optionally effectively employed. Dual cure systems are disclosed and claimed in U.S. patent application Ser. No. 927,932 filed on Sep. 11, 1997, U.S. Pat. No. 5,911,940 in the names of K. L. Walton and S. V. Karande, incorporated herein by reference. For instance, it is optionally desirable to employ azide crosslinking agents in conjunction with silane crosslinking agents, poly(sulfonyl azide) crosslinking agents in conjunction with radiation, poly(sulfonyl azide) crosslinking agents in conjunction with silane crosslinking agents, and the like.

The elastomeric phase polymers are incorporated into thermoplastic polyolefins to form thermoplastic vulcanizates. The proportions of ingredients utilized vary somewhat with the particular polyolefin employed, with the desired application, as well as with the character of the crosslinked elastomeric phase polymer and compounding ingredients. In most instances, as the amount of the crosslinked elastomeric phase polymer increases, the stiffiiess of the resultant thermoplastic vulcanizate decreases. The thermoplastic vulcanizates of the invention advantageously comprise at least about 20, preferably at least about 25, more preferably at least about 30 of weight percent of the polyolefin to avoid a thermoset blend rather than a thermoplastic vulcanizate; correspondingly there is preferably up to about 80, preferably up to about 75, more preferably up to about 70 weight percent of the crosslinked elastomeric phase polymer.

Advantageous polyolefins include thermoplastic, preferably crystalline, high molecular weight polymers preferably prepared by the polymerization of one or more monoolefins. The molecular weight is advantageously greater than about 5,000, more preferably greater than about 20,000. The crystalline melting temperature of the polyolefin (measured by DSC, dynamic scanning calorimetry) is preferably greater than 70° C. Examples of suitable polyolefins include ethylene and the isotactic and syndiotactic monoolefin polymer resins, such as propylene, 1-butene, 1-pentene, 1-hexene, 2-methyl-1-propene, 3-methyl-1-pentene, 4-methyl-1-pentene, 5-methyl-1-hexene and mixtures thereof. Most advantageously, the thermoplastic vulcanizates of the invention utilize isotactic polypropylene as the polyolefin component.

Olefinic polymers (polyolefins) suitable for use as non-elastomeric components employed in the present invention are aliphatic α-olefin homopolymers or interpolymers, or interpolymers of one or more aliphatic α-olefins and one or more non-aromatic monomers interpolymerizable therewith such as $C_2$–$C_{20}$ α-olefins or those aliphatic α-olefins having from 2 to about 20 carbon atoms and containing polar groups. Suitable aliphatic α-olefin monomers which introduce polar groups into the polymer include, for example, ethylenically unsaturated nitriles such as acrylonitrile, methacrylonitrile, ethacrylonitrile, and the like; ethylenically unsaturated anhydrides such as maleic anhydride; ethylenically unsaturated amides such as acrylamide, methacrylamide and the like; ethylenically unsaturated carboxylic acids (both mono- and difunctional) such as acrylic acid and methacrylic acid, and the like; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate and the like; ethylenically unsaturated vinyl so alcohols, such as ethylene vinyl alcohol (EVOH); ethylenically unsaturated dicarboxylic acid imides such as N-alkyl or N-aryl maleimides such as N-phenyl maleimide, and the like. Preferably such monomers containing polar groups are acrylic acid, vinyl acetate, maleic anhydride and acrylonitrile. Halogen groups which are optionally included in the polymers from aliphatic α-olefin monomers include fluorine, chlorine and bromine; preferably such polymers are chlorinated polyethylenes (CPEs). Preferred olefinic polymers for use in the present invention are homopolymers or interpolymers of an aliphatic, including cycloaliphatic, α-olefin having from 2 to 18 carbon atoms. Examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The olefinic polymer blend component optionally contains, in addition to the α-olefin, one or more non-aromatic monomers interpolymerizable therewith. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (as determined by ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes, for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 792, and a melt index (according to ASTM-1238, condition 1) in the range of from 0.01 to 100, and preferably from 0.1 to 50 grams per 10 minutes.

The heterogeneous LLDPE employed in the present composition generally has a density of from 0.89 to 0.94 g/cc (ASTM D 792) and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous ethylene polymers. The homogeneous linear ethylene polymers contain no long chain branches and have only branches derived from the monomers (if having more than two carbon atoms). Homogeneous linear ethylene polymers include those made as described in U.S. Pat. No. 3,645,992 (Elston), and those made using so-called single site catalysts in a batch reactor having relatively high olefin concentrations for instance as described in U.S. Pat. Nos. 5,026,798 and 5,055,438 (Canich). The uniformly branched/homogeneous linear ethylene polymers are those polymers in which the comonomer is randomly distributed within a given interpolymer molecule and wherein the interpolymer molecules have a similar ethylene/comonomer ratio within that interpolymer.

The homogeneous linear ethylene polymer employed in the present composition generally has a density of from 0.89 to 0.94 g/cc (ASTM D 792), and a melt index (ASTM-1238, condition I) in the range of from 0.01 to 100, and preferably from 0.1 to 50 grams per 10 minutes. Preferably the homogeneous linear ethylene polymer is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in the non-elastomeric component of the blends of the present invention. These polymers have a processability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,272,236 and 5,278,272 which are incorporated herein by reference.

The density of the SLOP as measured in accordance with ASTM D-792 is generally from 0.89 g/cc to 0.97 g/cc, preferably from 0.92 g/cc to 0.97 g/cc, and especially from 0.93 g/cc to 0.92 g/cc.

The melt index, according to ASTM D-1238, Condition 190° C./2.16 kg (also known as $I_2$), of the SLOP is generally from 0.01 g/10 min. to 1000 g/10 min., preferably from 0.01 g/10 min. to 100 g/10 min., and especially from 0.01 g/10 min. to 10 g/10 min.

The SLOP can be a homopolymer of $C_2$–$C_{20}$ olefins, such as ethylene, propylene, 4-methyl-1-pentene, and the like, or it can be an interpolymer of ethylene with at least one $C_3$–$C_{20}$ α-olefin. SLOP can also be an interpolymer of ethylene with at least one of the above $C_3$–$C_{20}$ α-olefins, or in combination with other unsaturated monomers.

Especially preferred olefin polymers suitable for use as non-elastomeric component comprise LDPE, HDPE, heterogeneous LLDPE, homogeneous linear ethylene polymers, SLOP, polypropylene (PP), especially isotactic polypropylene and rubber toughened polypropylenes, or ethylene-propylene interpolymers (EP), or chlorinated polyolefins (CPE), or ethylene-vinyl acetate copolymers (EVA), or ethylene-acrylic acid copolymers (EAA), or any combination thereof.

Preparation of Thermoplastic Vulcanizates

The thermoplastic vulcanizates of the invention are preferably prepared by dynamic vulcanization, wherein a mixture of the non-crosslinked elastomeric phase polymer is admixed with an appropriate curing agent to form an admixture which is then admixed with at least one polyolefin to form a blend, which is then heated and masticated at vulcanization temperature (at least the decomposition temperature of the C—H insertion curing agent). In particular, the non-crosslinked elastomeric phase is blended or admixed with at least one C—H insertion curing agent. After the curing agent and elastomeric phase are thoroughly admixed, at least one polyolefin is mixed with the first resulting admixture of elastomeric phase and curing agent preferably at a temperature above the melting point of the non-elastomeric phase but below decomposition temperature of curing agent, e.g. advantageously below about 150° C. for a poly(sulfonyl azide). The resulting blend is preferably subsequently masticated using conventional masticating equipment within the skill in the art, such as a Banbury mixer, Brabender mixer, or a mixing extruder. The temperature of the blend during mastication is preferably that sufficient to effect vulcanization of the elastomeric phase polymer. A suitable range of vulcanization temperatures is from the melting temperature of the polyolefin resin (about 120° C. in the case of polyethylene and about 130–170° C. in the case of polypropylene) to the temperature at which the elastomeric phase, the polyolefin, or the curing agent degrades. Typical temperatures are from 180° C. to 250° C., preferably from 180° C. to 200° C. Alternatively the blend is prepared and advantageously sufficiently mixed to disperse the elastomeric phase in the other olefin but preferably less than sufficiently to result in migration of sufficient curing agent into the non-elastomeric phase to result in crosslinking thereof. Then the blend is heated and masticated sufficiently to crosslink or cure the elastomer phase to form a thermoplastic vulcanizate. Variations on this general description are within the skill in the art and within the scope of the invention. For instance, the admixture of elastomeric polymer and C—H insertion agent is optionally pelletized and a tumble blend formed of the resulting elastomeric phase pellets with polyolefin pellets, e.g. at room temperature. Alternatively, an elastomeric pellet having C—H insertion therein is melt blended with the polyolefin at the temperature below decomposition temperature of the insertion agent.

In forming a TPV it is advantageous that the admixture of elastomeric and non-elastomeric phases be mixed sufficiently to result in the formation of a thermoplastic material, hereinafter thermoplastic vulcanizate. Recognition of insufficient mixing to result in a TPV is within the skill in the art and is detected by observation of the morphology of non-elastomeric phase by transmission electron microscopy. In a TPV, the non-elastomeric phase appears continuous or co-continuous so that the TPV has thermoplastic melt flow character and can, thus, be melt processed. For instance, an amount of mixing corresponding to about 60 rpm (revolutions per minute) in a mixing bowl commercially available from Haake Inc. under the trade designation Rheomix 6000 or about 150 rpm (revolutions per minute) on a twin screw extruder commercially available from Werner Pfleiderer under the trade designation ZSK-30 is sufficient to form a TPV from about 20 to about 80 weight percent polypropylene and from about 80 to about 20 weight percent of an interpolymer of ethylene and styrene or similar elastomeric phase. When the elastomeric phase is an EPDM, the amount of mixing is similar to that used for an ethylene styrene interpolymer.

The TPV's of the invention are advantageously used to form foams. Resulting foam structures of the present invention optionally take any physical configuration within the skill in the art, such as sheet, plank, injection molded articles, or bun stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, *Handbook of Polymer Foams and Technology*, edited by D. Klempner and K. C. Frisch, Hanser Publishers, Munich, Vienna, New York, Barcelona (1991), which is incorporated herein by reference particularly pages 227–233. Foam forming steps of the process are within the skill in the art. For instance as exemplified by the excellent teachings to processes for making ethylenic polymer foam structures and processing them in C. P. Park. "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated here in by reference.

The resulting foam structure is optionally made by a extrusion foaming process within the skill in the art. The structure is advantageously prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent is optionally incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to advantageously disperse the blowing agent homogeneously therein. Optionally, a nucleator is optionally blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure is optionally superatmospheric or subatmospheric (vacuum), but is preferably at an atmospheric level.

In another embodiment, the resulting foam structure is optionally formed in a coalesced strand form by extrusion of the polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

Alternatively, the resulting foam structure is conveniently formed by an accumulating extrusion process as seen in U.S. Pat. No. 4,323,528, which is incorporated by reference herein. In this process, low density foam structures having large lateral cross-sectional areas are prepared by: 1) forming under pressure a gel of the polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

In another embodiment, the resulting foam structure is formed into non-crosslinked foam beads suitable for molding into articles. To make the foam beads, discrete polymer particles such as granulated polymer pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

The foam beads are conveniently molded by any means known in the art such as charging the foam beads to the mold, compressing the mold to compress the beads, and heating the beads such as with steam to effect coalescing and welding of the beads to form the article. Optionally, the beads are optionally impregnated with air or other blowing agent at an elevated pressure and temperature prior to charging to the mold. Further, the beads are optionally heated prior to charging. The foam beads are optionally then be molded into blocks or shaped articles by a suitable molding method known in the art such as are taught in U.S. Pat. Nos. 3,504,068 and 3,953,558.

Blowing agents useful in making the resulting foam structure include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,-2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1 fluoroethane (HCFC-141b), 1-chloro 1,1-difluoroethane (HCFC-142b), 1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, barium azodicarboxylate, N,N'-dimethyl-N,N'-dinitrosoterephthalamide, and benzenesulfonhydrazide, 4,4-oxybenzene sulfonyl semicarbazide, and p-toluene sulfonyl semicarbazide trihydrazino triazine. Preferred blowing agents include isobutane, HFC-152a, and mixtures of the foregoing.

The amount of blowing agent incorporated into the polymer melt material to make a foam-forming polymer gel is from about 0.2 to about 5.0, preferably from about 0.5 to about 3.0, and most preferably from about 1.0 to 2.50 gram moles per kilogram of polymer.

Various additives are optionally incorporated in the resulting foam structure such as stability control agents, nucleating agents, inorganic fillers, pigments, antioxidants, acid scavengers, ultraviolet absorbers, flame retardants, processing aids, extrusion aids, and the like.

A stability control agent is optionally added to the present foam to enhance dimensional stability. Preferred agents include amides and esters of $C_{10-24}$ fatty acids. Such agents are seen in U.S. Pat. Nos. 3,644,230 and 4,214,054, which are incorporated herein by reference. Most preferred agents include stearyl stearamide, glyceromonostearate, glycerol monobehenate, and sorbitol monostearate. Typically, such stability control agents are employed in an amount ranging from about 0.1 to about 10 parts per hundred parts of the polymer.

The resulting foam structure preferably exhibits excellent dimensional stability. Preferred foams recover 80 or more percent of initial volume within a month with initial volume being measured within 30 seconds after foam expansion. Volume is measured by a suitable method such as cubic displacement of water.

In addition, a nucleating agent is optionally added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

The resulting foam structure is substantially non-crosslinked or uncrosslinked. The polymer material comprising the foam structure is substantially free of crosslinking. The foam structure contains no more than 5 percent gel as measured according to ASTM D-2765-84 Method A. A slight degree of crosslinking, which occurs naturally without the use of crosslinking agents or radiation, is permissible.

The foam structure advantageously has density of less than about 250, more preferably less than about 100 and most preferably from about 10 to about 70 kilograms per cubic meter. The foam advantageously has an average cell size of from about 0.05 to about 5.0, more preferably from about 0.2 to about 2.0, and most preferably about 0.3 to about 1.8 millimeters according to ASTM D3576.

The foam structure optionally takes any physical configuration known in the art, such as extruded sheet, rod, plank, and profiles. The foam structure may also be formed by molding of expandable beads into any of the foregoing configurations or any other configuration.

The foam structure is optionally closed-celled or open-celled according to ASTM D2856-A.

In one embodiment of the invention, compositions formed by the process of the invention are utilized in cable insulation and/or cable jacketing. The cable insulation of his invention is optionally filled or unfilled. If filled, then the amount of filler present should not exceed an amount that would cause degradation of the electrical and/or mechanical properties of the interpolymers. Advantageously, the amount of filler present is between 20 and 80, preferably between 50 and 70, weight percent (weight percent) based on the weight of the polymer. Representative fillers include kaolin clay, magnesium hydroxide, silica, calcium carbonate. In a preferred embodiment of this invention in which a filler is present, the filler is coated with a material that will prevent or retard any tendency that the filler might otherwise have to interfere with the cure reactions. Stearic acid is illustrative of such a filler coating. Other additives can be used in the preparation of and be present in the insulation of this invention, and include antioxidants, processing aids, pigments and lubricants.

In another embodiment of this invention, the compositions of the invention are shaped into automotive weatherstripping, gaskets or seals. This weatherstripping is useful as a sealing system for doors, trunks, belt lines, hoods, and similar items. These materials can be processed on thermoplastic equipment within the skill in the art. The is articles made from crosslinked interpolymers advantageously have better sound insulation than conventional sulfur-cured EPDM weatherstripping.

Carbon black is advantageously preferably added to the blend of the elastomeric phase polymer and other polymer prior to vulcanization. Carbon black is advantageously provided in an amount from 0 to about 50 weight percent, advantageously from about 0.5 to about 50 weight percent, based on the total formulation weight. When the carbon black is employed to mask a color, it is advantageously employed in the range of about 0.5 to about 10 weight percent, based on the total weight of the formulation. When the carbon black is employed to increase toughness and/or decrease cost, it is advantageously employed in amounts greater than 10 weight percent, based on the total weight of the formulation.

One or more extender oils are advantageously added to the blend of the elastomeric phase polymer and polyolefin prior to vulcanization. Suitable extender oils are listed in *Rubber World Blue Book* 1975 Edition, Materials and Compounding Ingredients for Rubber, pages 145–190. Typical classes of extender oils include aromatic, naphthenic, and paraffinic extender oils. The extender oil(s) are advantageously provided in an amount from about 0 to about 50 weight percent based on the total formulation weight. When employed, the extender oil will advantageously be provided in an amount of at least about 5 weight percent, more advantageously in an amount of from about 15 to about 25 weight percent, based on the total weight of the formulation.

Additives such as antioxidants (e.g., hindered phenols, for example, those commerically available from Ciba-Geigy Corporation under the trade designation Irganox™ 1010), phosphites (e.g., the phosphite commerically available from Ciba Geigy Corporation under the trade designation Irgafos™ 168)), U. V. stabilizers, cling additives (e.g., polyisobutylene), antiblock additives, colorants, pigments, fillers, and the like can also be included in the interpolymers employed in the blends of and/or employed in the present invention, to the extent that they do not interfere undersirably with the practice of the invention.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants are advantageously in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can conveniently be employed in the range of from 0.05 to 50, preferably from 0.1 to 35, more preferably from 0.2 to 20 percent by weight based upon the weight of the polymer or polymer blend. However, in the instance of fillers, they are optionally employed in amounts up to 90 percent by weight based on the weight of the polymer or polymer blend.

In one preferred embodiment, the thermoplastic vulcanizates of the invention comprise from about 30 to about 60 weight percent of the elastomeric phase polymer, from about 15 to about 55 weight percent of the thermoplastic polyolefin (non-elastomeric phase), and from about 15 to about 30 weight percent of the extender oil. Such thermoplastic vulcanizates are particularly useful as moldings for automotive applications.

In a particularly preferred embodiment, the thermoplastic vulcanizates of the invention are characterized by an ASTM #2 oil swell of less than 60 percent, as determined by ASTM D-471.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Procedures

Monomer contents are determined by carbon-13 NMR spectroscopy.

Stress-strain properties are determined on an Instron model 1122 load frame using 0.870 inch (2.2 cm) microtensile samples measured at an extension rate of 5 inch/min (12.7 cm/min). Tensile break, elongation at break, and 100 percent modulus are measured in accordance with ASTM D-412.

Melt index is measured in accordance with ASTM D-1238.

Molecular weight and molecular weight distribution are determined by gel permeation chromatography.

ASTM #2 and #3 oil swells are measured in accordance with ASTM D-471.

The hardness is measured using a hand-held Shore A quadrant durometer made by Shore Intrument and Mfg. Co. This instrument was calibrated using a 60 durometer test bar. The durometer is depressed into the sample until the needle stops.

The upper service temperature (UST) is determined using a Perkin Elmer model TMA 7 thermo-mechanical analyzer (TMA). Probe force of 102 g and heating rate of 5° C./min were used. Test specimen was a disk with thickness of about 2 mm in diameter, prepared by melting pressing at 205° C. and air-cooling to room temperature. The UST was taken to be when the probe penetrated the sample 1.0 mm.

DSC (Differential Scanning Calorimetry) data are obtained using a Perkin-Elmer DSC-7. Samples are melt-pressed into thin films and put in aluminum pans. The samples are heated to 180° C. in the DSC and kept there for 4 min to ensure complete melting. The samples are then cooled at 10° C./min to −30° C. and heated to 140° C. at 10° C./min.

General procedures for determining compression set are described in ASTM D 395–89. The sample plaques are cut into disks of 1.14 inch diameter. The disks are stacked up to a thickness of 0.5 inch. Test specimens are measured under constant strain of 25 percent, at 70° C. for 22 h. The sample is aged at 70° C. for 22 h under 25 percent compression, cooled to 22° C.

Gel content is measured by xylene extraction which is performed by weighing out 1 gram samples of the polymer. The samples are transferred to a mesh basket which is then placed in boiling xylene for 12 hours. After 12 hours, the sample baskets are removed and placed in a vacuum oven at 150° C. and 28 in. of Hg (3.7 kPa) vacuum for 12 hours. After 12 hours, the samples are removed, allowed to cool to room temperature over a 1 hour period, and then weighed. The results are reported as percent polymer extracted.

percent extracted=(initial weight−final weight)/initial weight.

The reported value, percent gel, is calculated as: Percent Gel=100−percent extracted polymer Preparation of Polymers Used Interpolymers of alpha-olefins and vinyl aromatic polymers used in the examples are also referred to herein as Ethylene Styrene Interpolymers (ESI) and are synthesized according to the following general procedure:

Reactor Description

A 6 gallon (22.7 L), oil jacketed, autoclave continuously stirred tank reactor (CSTR) was employed as the reactor. A magnetically coupled agitator with impellers commercially available from Lightning Mixers, Inc. under the trade designation A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor there was a flow meter that measured flow and solution density. All lines on the exit of the reactor were traced with 50 psi (344.7 kPa) steam and insulated.

Procedure

Solvent (ethylbenzene for samples ESI 42 and ESI 72, and toluene for sample EPS) was supplied to the reactor at 30 psig (207 kPa). The feed to the reactor was measured by a mass flow meter. A variable speed diaphragm pump controlled the feed rate of solvent. At the discharge of the solvent pump, a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the reactor at 30 psig (308 kPa). The feed to the reactor was measured by a mass flow meter. A variable speed diaphragm pump controlled the feed rate. The styrene stream was mixed with the remaining solvent stream. Ethylene was supplied to the reactor at 600 psig (4,238 kPa). The ethylene stream was measured by a mass flow meter just prior to a valve controlling flow. A flow meter controller was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was reduced to about 5° C. by a heat exchanger with −5° C. glycol on the jacket thereof. This solvent/styrene stream entered the bottom of the reactor. The three component catalyst system described in Tables 1 and 2 and its solvent flush also enter the reactor at the bottom but through a different port than the monomer stream. Preparation of the catalyst components took place in an inert atmosphere glove box. The diluted components were put in nitrogen padded cylinders and charged to catalyst run tanks for the reaction. From these run tanks the catalyst was pressured with piston pumps and the flow was measured with flow meters. These streams combine with each other and the catalyst flush solvent just prior to entry through a single injection line into the reactor where they react to form the designated polymers.

Polymerization was stopped as reaction mixture flowed into a reactor product line after the reactor, by addition of catalyst kill (water mixed with solvent) into the reactor product line after a flow meter which measures solution density. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to ~250 mm Hg (33 kPa) of pressure absolute at the reactor pressure control valve. This flashed polymer entered a hot oil jacketed devolatilizer. Approximately 85 percent of the volatile compounds (hereinafter volatiles) were removed from the polymer in the devolatilizer. The volatiles exited the top of the devolatilizer. The stream of exiting volatiles was condensed and with a glycol jacketed exchanger, entered the suction of a vacuum pump and was discharged to a glycol jacket solvent and styrene/ethylene separation vessel. Solvent and styrene were removed from the bottom of the vessel and ethylene from the top. The ethylene stream was measured with a flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to an extruder commercially available from Werner Pfleiderer Corporation under the trade designation ZSK-30 devolatilizing vacuum extruder. The dry polymer exited the extruder as a single strand. This strand was cooled as it was pulled through a water bath. The excess water was blown from the strand with air and the strand was chopped into pellets with a strand chopper.

The catalyst used in preparing ESI-42 and ESI 72 was dimethyl[N-(1,1-dimethylethyl)-1,1-dimethyl-1-[(1,2,3,4,5-.eta.)-1,5,6,7-tetrahydro-3-phenyl-s-indacen-1-yl] silanaminato(2-)-N]-titanium. The catalyst used in preparing EPS was (t-butylamido)dimethyl (tetramethylcyclopentadienyl)silane-titanium (II) 1,3-pentadiene. A modified methylaluminoxane commercially available from Akzo Nobel under the trade designation MMAO-3A was also used in the amounts indicated in Tables 1 and 2 and is referred to herein as MMAO.

for 26 hours at ambient temperature and then was filtered to remove sodium chloride. The filter cake was washed with acetone and the combined filtrate evaporated to yield a white solid which was washed twice with 20 mL portions of water and then dried at ambient temperature under vacuum. The resulting white solid (7.3 g, 70 percent yield) was identified as 4,4'-disulfonylazidophenyl ether by $^1$H and $^{13}$C NMR spectroscopy. The following materials were used:

ESI42- is an ethylene/styrene interpolymer having 42 weight percent styrene and 58 weight percent ethylene. The overall sample also contains 0.5 weight percent styrene homopolymer as an impurity. It has a melt index (MI) of 0.5 g/10 minutes at 190° C. under a 2 pound load. ESI42 is prepared as outlined previously.

ESI72 is an ethylene/styrene interpolymer having 72 weight percent styrene and 28 weight percent ethylene. The overall sample also contains 3.0 weight percent styrene homopolymer as an impurity. It has a melt index (MI) of 1.3 g/10 minutes at 190° C. under a 2 pound load. ESI72 is prepared as outlined previously.

EPS is an ethylene/propylene/styrene interpolymer having 56 weight percent styrene, 6 weight percent propylene and 36 weight percent ethylene. The overall sample also contains 6 weight percent polystyrene homopolymer as an impurity. It has a melt index (MI) of 2.9 g/10 minutes at 190° C. under a 2 pound load. EPS is prepared as outlined previously.

SBS- a Styrene-Butadiene-Styrene block copolymer-commercially available from DEXCO Polymers under the trade designation VECTOR™ 6241-D. This product has a reported melt index of 23 grams per 10

TABLE 1

Catalyst and Cocatalyst employed (U.S. units)

| Sample | Reactor Temp ° C. | Solvent Flow lb/hr | Ethylene flow lb/hr | Hydrogen flow SCCM | Styrene flow lb/hr | Ethylene Conv. % | Cocat Bor/Ti ratio | MMAO Al/Ti ratio | Propylene flow lb/hr |
|---|---|---|---|---|---|---|---|---|---|
| ESI42 | 91 | 37 | 2.78 | 8.3 | 5.0 | 96.5 | 3.49 | 3.5 | 0 |
| ESI72 | 78 | 41.0 | 2.18 | 3.5 | 21.0 | 96.1 | 3.50 | 6.0 | 0 |
| ESP | 66 | 22.3 | 1.19 | 8.0 | 12.0 | 78.2 | 3.0 | 6.0 | 0.2 |

SCCM means standard cubic centimeter
"Cocat Bor" refers to the boron containing cocatalyst which is tris(pentafluorophenyl)borane.

TABLE 2

Catalyst and Cocatalyst employed (SI units)

| Sample | Reactor Temp ° C. | Solvent Flow kg/hr | Ethylene flow kg/hr | Hydrogen flow SCCM | Styrene flow lb/hr | Ethylene Conv. % | Cocat Bor/Ti ratio | MMAO Al/Ti ratio | Propylene flow lb/hr |
|---|---|---|---|---|---|---|---|---|---|
| ESI42 | 91 | 16.7 | 1.25 | 8.3 | 2.26 | 96.5 | 3.49 | 3.5 | 0 |
| ESI72 | 78 | 18.5 | 0.98 | 3.5 | 9.48 | 96.1 | 3.50 | 6.0 | 0 |
| ESP | 66 | 10.1 | 0.54 | 8.0 | 5.42 | 78.2 | 3.0 | 6.0 | 0.09 |

SCCM means standard cubic centimeter
"Cocat Bor" refers to the boron containing cocatalyst which is tris(pentafluorophenyl)borane.

Preparation of 4,4'-disulfonylazidophenyl ether 4.4'-bis(chlorosulfonyl)phenyl ether (10 g, 0.027 mole) was dissolved in 100 mL of acetone and 4.426 g (0.06808 moles) of solid sodium azide was added portionwise over the course of 15 minutes. The reaction mixture was stirred minutes (ASTM D 638 Condition G) and a styrene to rubber weight ratio of 43/57.

SIS- a Styrene-Isoprene-Styrene block copolymer commercially available from DEXCO Polymers, under the trade designation VECTOR™ 4114. This product has a reported melt index of 24 grams per 10 minutes (ASTM D 638 Condition G) and a weight ratio of styrene to rubber ratio of 15/85.

SEBS- a Styrene-Ethylene/butylene-Styrene block copolymer commercially available from Shell Chemical Company under the trade designation KRATON™ G1652. This product has a reported melt index of 10 grams per minute. The styrene to rubber is weight ratio is 29/71.

EPDM- a Ethylene/Propylene/1,4-hexadiene copolymer commercially available from DuPont Dow Elastomers LLC under the trade designation Nordel™ 3681. This product has a reported Mooney viscosity of 45 (by ASTM D 1646-92).

EXAMPLE 1

Preparation of TPV by Adding Non-elastomeric Phase to Admixture of Elastomeric Phase and C—H Insertion Curing Agent.

As elastomer phase, 26.0 g of ESI42 (described previously) was added to a mixer commercially available from Haake Inc. under the trade designation Haake Rheocord System 9000 Torque Rheometer equipped with a mixing bowl commercially available from Haake Inc. under the trade designation Haake 600 mixing bowl with roller style blades. The initial bowl temperature was 140° C., and the sample was mixed at 75 rpm. Once the polymer had melted, 0.52 g (1.67 mmole) of 4,4'-disulfonylazidophenyl ether was added to the mixing bowl and the run clock was started. After 4 minutes (t=4), 16.0 g of polypropylene homopolymer (PP) of melt flow rate (MFR) 20 at 230° C. at 2.16 kg load, nucleated, containing antistat and commercially available from The Dow Chemical Company under the trade designation H 701-20NA-20 MFR was added. At t=5 minutes (1 minute after polypropylene addition), the temperature of the mixing bowl was ramped from 140° C. to 180° C. over a 3 minute period at 75 rpm. At t=10 minutes, the mixing bowl was stopped and the resulting thermoplastic vulcanizate (TPV) sample containing crosslinked ESI in a polypropylene matrix was removed. This sample was compression molded into a 1/16 inch (0.0016 m) plaque in a press commercially available from Carver Inc. under the trade designation Carver (Model 4095-4PR 1001) at a temperature of 190° C. and the tensile properties and TMA behavior of the sample were recorded (see Table 3).

This sample demonstrates that an ESI/PP TPV can be prepared using a disulfonylazide (4,4'-disulfonylazidophenyl ether) as a crosslinking agent for the ESI phase. The sample of Example 1 has higher upper service temperature and lower compression set than the control sample (Comparative Sample B).

EXAMPLE 2

A sample, 24.0 g, of ESI42 ethylene/styrene interpolymer was added to the mixer and bowl used in Example 1. The bowl temperature was 140° C. and the sample was mixed at 60 RPM. A sample of 0.48 g (1.54 mmole) of 4,4'-disulfonylazidophenyl ether was added and the resulting combined sample was mixed for 5 minutes, and then the resulting admixture was removed from the mixing bowl. The bowl was cleaned and the temperature was raised to 190° C. A sample of 16.0 g of polypropylene commercially available from Montell Polyolefins under the trade designation Profax 6523-Lot BE31563 was added and mixed at 60 RPM. After 3 minutes, the pre-compounded ESI/4,4'-disulfonylazidophenyl ether admixture was added to the melted polypropylene. After 7 more minutes (t=10 minutes), mixing was stopped and the ESI/PP TPV was removed from the mixing bowl. The sample was compression molded using the procedure of Example 1 at a temperature 190° C. into a 1/16 inch (0.0016 m) thick plaque and the UST of the sample was measured by TMA (see Table 3).

This example illustrates another method for producing a ESI/PP TPV using a difinctional sulfonyl azide compound (4,4'-disulfonylazidophenyl ether) as the cross-linking agent.

Comparative Sample A

Addition of Curing Agent to Blend of Phases

A 24.0 g sample of ESI42 ethylene/styrene interpolymer (ESI) and 16.0 g of polypropylene (PP) (commercially available from Montell Polyolefins under the trade designation Profax6523) was added to the mixer and bowl identified in Example 1. The bowl temperature was 180° C. and the sample was mixed at 60 RPM. After 5 minutes, 0.48 g of 4,4'-disulfonylazidophenyl ether was added. The mixture was compounded for 5 more minutes. The sample was removed from the mixing bowl and found to be of extremely high melt viscosity.

An attempt was made to compression mold a sample plaque using the same conditions as was used in Examples 1 and 2; however a good compression molded sample could not be produced because the material was thermoset. It is believed that both the PP and ESI phase had been cross-linked by the sulfonyl azide as evidenced by the loss of thermoplastic nature of polypropylene. Thermoplastic nature is necessary to supply melt processibility of the blend for molding.

This example illustrates the formation of a TPV from admixture of C—H insertion curing agent with elastomeric phase is a surprising result as compared with the process illustrated here which corresponds to the previously preferred process of forming a TPV using other types of curing agents, where the polymers are mixed before curing agent is added.

EXAMPLE 3

Addition of Oil to a TPV of the Invention.

The process of Example 1 is repeated using 18.0 g of ESI42 ethylene/styrene interpolymer (ESI) 0.36 g (1.15 mmole) of 4,4'-disulfonylazidophenyl ether, and 10.0 g of polypropylene (PP) (commercially available from The Dow Chemical Company under the trade designation H 701-20NA-20 MFR) except that at t=9 minutes, 12.0 g of mineral oil commercially available from Shell Chemical Company under the trade designation Shellflex 371 was added dropwise to the mixing bowl via pipet over a period of 4 minutes. The sample was removed from the mixing bowl at t=15 minutes. This sample was compression molded into a 1/16 inch (0.0016 m) thick plaque and the tensile properties, upper service temperature, and hardness of the sample were measured. This sample was transparent in nature, suggesting very small domain size for the ESI phase and it was also much softer than the polymer composition resulting from Example 1 or 2.

This sample illustrates addition of oil to the TPV sample to decrease the hardness of the sample. Furthermore, addition of oil greatly increases the transparency of the ESI/PP TPV.

EXAMPLE 4

Use of a Higher Styrene Content Elastomer in the Practice of the Invention.

The procedure of Example 1 is repeated except that the elastomeric phase is 26.0 g of ESI72 ethylene/styrene interpolymer (described previously) was used in place of the ESI42. This sample was compression molded into a 1/16 inch (0.0016 m) plaque and the tensile properties and TMA behavior of the sample was recorded (see Table 3). This sample illustrates the ability to produce TPV's with high styrene content ESI.

EXAMPLE 5
Use of an SBS Elastomeric Phase

The procedure of Example 1 is repeated except that the elastomeric phase is 26.0 g of Styrene-Butadiene-Styrene triblock copolymer (SBS) (composition described previously). This sample was compression molded into a 1/16 inch (0.0016 m) plaque and the tensile properties and TMA behavior of the sample was recorded (see Table 3).

EXAMPLE 6
Use of an SIS Elastomeric Phase.

The procedure of Example 1 is repeated except that the elastomer phase is 26.0 g of Styrene-Isoprene-Styrene triblock copolymer (SIS) (described previously). This sample was compression molded into a 1/16 inch (0.0016 m) plaque and the tensile properties and TMA behavior of the sample was recorded (see Table 3).

EXAMPLE 7
Use of an SEBS Elastomeric Phase.

The procedure of Example 1 is repeated except that the elastomeric phase is 26.0 g of Styrene-Ethylene/Butylene-Styrene triblock copolymer (SEBS) (described previously). This sample was compression molded into a 1/16 inch (0.0016 m) plaque and the tensile properties and TMA behavior of the sample was recorded (See Table 3).
Note: This sample displayed excellent transparency and toughness compared to the SBS and SIS samples of

EXAMPLE 8
Use of EPDM Elastomer Phase.

The procedure of Example 1 is repeated except that the elastomeric phase is 26.0 g of Ethylene/propylene/diene monomer copolymer (EPDM) (described previously). This sample was compression molded into a 1/16 inch (0.0016 m) plaque and the tensile properties and TMA behavior of the sample was recorded (see Table 3).
Note: This sample displayed higher melt viscosity than the samples made with ESI, SBS, SEBS, and SIS. (Examples 1, 5, 6, and 7 respectively).

Comparative Sample B
Control Without Curing Agent.

The procedure of Example 1 is repeated except that no 4,4'-disulfonylazidophenylether is used. This sample was compression molded into a 1/16 inch (0.0016 m) plaque and the tensile properties and TMA behavior of the sample was recorded (see Table 3).

Note: This sample is not crosslinked and is a comparative to Examples 1 and 2

EXAMPLE 9
The Use of EPS as Elastomeric Phase.

The procedure of Example 1 is repeated except that the elastomeric phase is 18.0 g of EPS (described previously), and 0.36 g (1. 15 mmole) of 4,4'-disulfonylazidophenyl ether is used as curing agent. Also, at t=9 minutes, 12.0 g of mineral oil commercially available from Shell Chemical Company under the trade designation Shellflex 371 was added dropwise to the mixing bowl via pipet over a period of 4 minutes. The sample was removed from the mixing bowl at t=15 minutes. This sample was compression molded into a 1/16 inch (0.0016 m) thick plaque and the tensile properties, upper service temperature, and hardness of the sample were measured.

TABLE 3

Properties of TPV's prepared by crosslinking the elastomer phase with sulfonyl azide.

| Sample | Composition (% elastomer/% crystalline phase by weight) | UST (TMA-° C.) | Hardness Shore A | % Elongation | Break Stress (PSI) | Compression set (70° C.) |
|---|---|---|---|---|---|---|
| Example 1 | 65/35 ES42/PP* | 175 | 95 | 240 | 2350 | 55% |
| Example 2 | 65/35 ES42/PP | 165 | 95 | N.D. | N.D. | N.D. |
| Example 3 | 30/45/25 Oil/ES42/PP | 150 | 78 | 290 | 850 | 49% |
| Example 4 | 65/35 ES72/PP | 164 | 96 | 170 | 2210 | 46% |
| Example 5 | 65/35 SBS/PP | 162 | 95 | 43 | 1270 | 96% |
| Example 6 | 65/35 SIS/PP | 159 | 95 | 57 | 817 | 76% |
| Example 7 | 65/35 SEBS/PP | 175 | 95 | 230 | 3000 | 68% |
| Example 8 | 65/35 EPDM/PP | 160 | 95 | 110 | 1400 | 64% |
| Comparative Sample B | 65/35 ES42/PP (Control) | 95 | 95 | 500 | 2900 | 105% |
| Example 9 | 30/45/25 Oil/EPS56/PP | 140 | 80 | 320 | 700 | 63% |

*PP is polypropylene
N.D. is not determined

Examples 5 and 6, respectively. This increased toughness is evidenced by the higher elongation to break values and higher break stress values as compared to those of the SBS and SIS samples.

The results from Ex. 1–4 indicate that a TPV can be prepared from polypropylene and ESI using the procedure of this invention. The resulting TPV has higher UST and lower compression set than the blend of Comparative Sample B (without sulfonyl azide curing agent). The result of the Comparative Sample A (where the sample was thermoset and not moldable for testing) shows the importance of the process of the invention in which the curing agent is mixed with the elastomer before the elastomer is mixed with the other phase. If the curing agent is added into a melt mixture of PP and ESI, a thermoset blend was obtained instead of TPV.

The results from Examples 4–7 indicate that TPVs with high UST can be prepared from polypropylene and a styrenic block copolymer such as SBS, SIS, and SEBS using the process of this invention. The results of Example 8 and Example 9 indicate that EPDM and EPS can be used as an elastomer phase to make a TPV using the process of this invention. The formation of a TPV is evidenced by the high UST and low compression set relative to that of the control sample B.

What is claimed is:

1. A process for forming a thermoplastic vulcanizate comprising:
    (a) admixing a C—H insertion curing agent with at least one elastomeric phase polymer to form a first admixture;
    (b) admixing at least one non-elastomeric polyolefin with the first admixture to form a second admixture; and
    (c) heating the second admixture to a temperature at least the decomposition temperature of the curing agent to crosslink the elastomeric phase while mixing that admixture to an extent sufficient to result in the formation of a thermoplastic material, hereinafter referred to as a thermoplastic vulcanizate wherein step (b) admixing is sufficient to disperse the first admixture in the non-elastomeric polyolefin but not sufficient to result in a crosslinking amount of curing agent being admixed into the non-elastomer polyolefin.

2. The process of claim 1 wherein the C—H insertion curing agent is selected from alkyl and aryl azides (—N$_3$), acyl azides (—C(O)N$_3$), azidoformates (—O—C(O)—N$_3$), sulfonyl azides (—SO$_2$—N$_3$), phosphoryl azides ((O)$_2$—(PO)—N$_3$), phosphinic azides (—P(O)—N$_3$) and silyl azides (—Si—N$_3$).

3. The process of claim 2 wherein the C—H insertion agent is a poly(sulfonyl azide).

4. The process of claim 3 wherein the poly(sulfonyl azide) is selected from 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris (sulfonyl azide), 4,4'-diphenyl ether bis(sulfonyl azide), 1,6-bis(4'-sulfonazidophenyl)hexane, 2,7-naphthalene bis (sulfonyl azide), mixed sulfonyl azides of chlorinated aliphatic hydrocarbons containing an average of from 1 to 8 chlorine atoms and from about 2 to 5 sulfonyl azide groups per molecule, oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide), bis(4-sulfonyl azidophenyl)methane, and mixtures thereof.

5. The process of claim 1 wherein the curing agent is used in an amount sufficient to result in at least about 20 weight percent gel as measured by xylene extraction.

6. The process of claim 5 wherein the curing agent is used in an amount from at least about 0.2 phr (parts per hundred by weight of elastomeric phase polymer) to about 10 phr.

7. The process of claim 1 wherein the first admixture maintained at temperatures less than about 150° C. until the second admixture is formed, and the second admixture is exposed to temperatures greater than about 150° C.

8. The process of claim 7 wherein the second admixture is exposed to temperatures greater than about 180° C.

9. The process of claim 1 wherein the non-elastomeric polyolefin is less reactive with the C—H insertion curing agent than is the elastomeric phase polymer.

10. The process of claim 1 wherein the non-elastomeric polyolefin comprises at least about 20 weight percent of the resulting thermoplastic vulcanizate.

11. The process of claim 1 wherein the non-elastomeric polyolefin is an aliphatic polymer comprising at least about 50 weight percent propylene repeating units and the elastomeric phase polymer is selected from the group consisting of substantially random interpolymers comprising an olefin and a vinyl or vinylidene aromatic monomer, other elastomeric polymers formed from at least one vinyl or vinylidene aromatic monomer, and elastomeric polymer formed from ethylene, propylene and at least one diene monomers (EPDM).

12. The process of claim 11 wherein the elastomeric phase polymer comprises at least one elastomeric block copolymer selected from the group consisting of styrene/ethylene-butene copolymer, styrene/ethylene-propylene copolymer, styrene/ethylene-butene/styrene (SEBS) copolymer, styrene/ethylene-propylene/styrene (SEPS) copolymer and combinations thereof.

13. The process of claim 11 wherein the elastomeric phase polymer comprises at least one substantially random interpolymer containing from about 0.5 to 65 mole percent of at least one vinyl or vinylidene aromatic monomer and/or hindered aliphatic or cycloaliphatic vinyl or vinylidene monomer and from about 35 to about 99.5 mole percent of at least one aliphatic α-olefin having from 2 to about 20 carbon atoms.

14. The process of claim 13 wherein the number average molecular weight (Mn) of the elastomeric phase polymer is from about 10,000 to about 1,000,000.

15. The process of claim 1 wherein the second admixture also comprises at least one member of the group consisting of carbon black, silica, titanium dioxide, colored pigments, clay, zinc oxide, stearic acid, accelerator, curing agent, sulfur, stabilizer, antidegradant, processing aid, adhesive, tackifier, plasticizer, wax, precrosslinking inhibitor, discontinuous fiber, extender oil and a combination thereof.

16. The process of claim 1 wherein the non-elastomeric polyolefin comprises thermoplastic, crystalline polyolefin, with a crystalline melting temperature (measured by DSC) greater than about 70° C.

17. The process of claim 16 wherein the non-elastomeric polyolefin comprises at least one of polyethylene or isotactic and syndiotactic monoolefin polymer resins made from monomers belonging to the group consisting of propylene, 1-butene, 1-pentene, 1-hexene, 2-methyl-1-propene, 3-methyl-1-pentene, 4-methyl-1-pentene, 5-methyl-1-hexene and mixtures thereof.

18. The process of claim 1 wherein the non-elastomeric polyolefin comprises isotactic polypropylene.

19. The process of claim 1 wherein the admixture of elastomeric phase polymer and non-elastomeric polyolefin is mixed sufficiently to result in the formation of a thermoplastic material, that is sufficiently to avoid formation of thermoset polymer.

20. The process of claim 1 additionally comprising a step of (d) shaping the resulting thermoplastic vulcanizate.

21. The process of claim 20 wherein a fabricated part is formed.

22. A thermoplastic vulcanizate comprising a blend of:
    (1) an elastomeric phase crosslinked using a C—H insertion curing agent, said phase dispersed in;
    (2) at least one non-elastomeric thermoplastic polyolefin.

23. A foamable composition comprising
    (1) an elastomeric phase crosslinked using a C—H insertion curing agent, said phase dispersed in;
    (2) at least one non-elastomeric thermoplastic polyolefin; and
    (3) from about 0.1 to about 25 percent by weight based on the combined weight of components (1) and (2) of at least one foaming agent.

24. A fabricated part, cable jacket, cable insulation, or foam comprising the thermoplastic vulcanizate resulting from the process of claim 1.

* * * * *